(12) United States Patent
Beckman et al.

(10) Patent No.: US 9,504,347 B2
(45) Date of Patent: Nov. 29, 2016

(54) PORTABLE NESTED COOK-SET

(71) Applicant: Pacific Market International, LLC, Seattle, WA (US)

(72) Inventors: Michael Carl Beckman, Seattle, WA (US); Andrew C. F. Wahl, Seattle, WA (US); Evan M. Choltco-Devlin, Seattle, WA (US)

(73) Assignee: Pacific Market International, LLC, Seattle, WA (US)

( * ) Notice: Subject to any disclaimer, the term of this patent is extended or adjusted under 35 U.S.C. 154(b) by 0 days.

(21) Appl. No.: 14/447,186

(22) Filed: Jul. 30, 2014

(65) Prior Publication Data

US 2016/0029831 A1 Feb. 4, 2016

(51) Int. Cl.
*A47J 31/20* (2006.01)
*A23F 5/26* (2006.01)
*A47J 41/02* (2006.01)
*A47J 41/00* (2006.01)
*A47J 31/00* (2006.01)

(52) U.S. Cl.
CPC ............... *A47J 31/20* (2013.01); *A23F 5/262* (2013.01); *A47J 31/005* (2013.01); *A47J 41/0061* (2013.01); *A47J 41/02* (2013.01)

(58) Field of Classification Search
CPC ........ A47J 31/20; A47J 31/005; A47J 41/02; A47J 41/0061; A47J 33/00; B65D 77/0486; A23F 5/262; A45F 3/16
USPC .............. 206/541, 543, 544, 546; 220/23.83, 220/23.86, 23.87, 23.88, 23.89
See application file for complete search history.

(56) References Cited

U.S. PATENT DOCUMENTS

| 4,627,334 | A | | 12/1986 | Shanklin |
| 4,984,723 | A | * | 1/1991 | Hsu ........................... A45F 3/04 215/10 |
| 5,738,786 | A | * | 4/1998 | Winnington-Ingram .................. A47G 19/16 206/5 |
| 5,761,987 | A | * | 6/1998 | Leon ..................... A47J 27/002 126/373.1 |
| D407,273 | S | | 3/1999 | Moran |
| 6,561,080 | B1 | | 5/2003 | Feeney |
| D556,509 | S | | 12/2007 | Bonini |
| D729,578 | S | | 5/2015 | He |
| D730,119 | S | | 5/2015 | He |

(Continued)

FOREIGN PATENT DOCUMENTS

| WO | 2009012524 A1 | 1/2009 |
| WO | 2009104018 A1 | 8/2009 |
| WO | 2009137915 A1 | 11/2009 |

*Primary Examiner* — Fenn Mathew
*Assistant Examiner* — Robert Stodola
(74) *Attorney, Agent, or Firm* — George C. Rondeau, Jr.; Davis Wright Tremaine LLP

(57) ABSTRACT

A portable nested cook-set includes a cook pot having a pot sidewall with a retention projection and defining an upwardly opening pot interior chamber, a press-pot piston having a piston sidewall and a lower end portion defining an upwardly opening piston interior chamber, and a storage container having an exterior portion and a selectively sealable interior storage chamber. The piston sidewall has a sidewall opening and a retention notch positioned to removably receive the retention projection therein. The press-pot piston sidewall is dimensioned to be selectively storable at least partially within the cook pot. The storage container having an exterior portion with a lower portion dimensioned to be selectively storable at least partially within the piston interior chamber. The storage container and the press-pot piston being releasably threaded together.

7 Claims, 19 Drawing Sheets

(56) References Cited

U.S. PATENT DOCUMENTS

| | | |
|---|---|---|
| 2007/0137494 A1 | 6/2007 | Wilhite |
| 2009/0238725 A1* | 9/2009 | Ellis ................. B01L 3/502 422/400 |
| 2010/0038368 A1 | 2/2010 | Larreau |
| 2010/0224078 A1 | 9/2010 | Khalifa |
| 2011/0062153 A1* | 3/2011 | Wang ................ C02F 1/002 220/23.86 |
| 2013/0186280 A1* | 7/2013 | Sekiguchi ......... A47J 31/005 99/287 |

* cited by examiner

PORTABLE NESTED COOK-SET

BACKGROUND OF THE INVENTION

1. Field of the Invention

The present invention is directed generally to providing a nested cook-set for use in activities such as back-packing or camping that provides superior functionality over conventional nested cook-sets while taking up less space in a user's backpack or other storage container than known conventional elements that provide similar functionality.

2. Description of the Related Art

Certain known conventional portable cook pots utilize a "French press," also known as a press pot, coffee press, or coffee plunger, accessory as a simple coffee brewing device. Typically, such an accessory includes a metal or plastic lid for fitting over the top of the cook pot with a plunger disposed in a hole in the center of the lid and movable relative thereto. A lower mesh filter is affixed to a lower end of the plunger and fits tightly within interior of the cook pot. Coffee is brewed by heating water in the cook pot to approximately 93-96 degrees Celsius (200-205 degrees Fahrenheit) and adding a proportional amount of ground coffee to the heated water. The liquid is then allowed to brew (or steep) for approximately four to twenty minutes. The plunger is then depressed, causing the mesh filter to move the grounds to the bottom of the cook pot while the liquid is allowed to pass freely upward through the filter. The liquid may then be poured into a serving or storage container. If the brewed coffee is allowed to remain in the cook pot with the used grounds, the brewed coffee can become astringent and bitter, and will cool quickly. Thus, if the brewed coffee is not to be drunk until later, a separate insulated storage container is required. One such storage container that is desirable for use in a backpacking or camping environment is a vacuum bottle or vacuum flask. A vacuum bottle is an insulating storage vessel that greatly lengthens the time over which its contents remain hotter or cooler than the vacuum bottle's surroundings. A conventional vacuum bottle consists of an outer body and an inner liner, one within the other and joined at the neck. The gap between the outer body and inner liner is partially evacuated of air, creating a near-vacuum which significantly reduces heat transfer by conduction or convection. Vacuum bottles are used domestically to keep beverages hot or cold for extended periods of time.

Unfortunately, using these conventional approaches for brewing coffee involves a cook pot/press-pot combination having a plunger-style press, wherein the pressing element is moved relative to the cook pot via an axial plunging rod that extends from the center of the pressing element upwards to the opening of the cook pot, and an insulated storage container such as a vacuum bottle. Thus, conventionally, in order for a user to have a cook pot, a press-pot, and a sealable storage container, the user would need to carry and store several separate items of significant volume, which presents a problem for back-packing and camping where storage space is limited.

BRIEF DESCRIPTION OF THE SEVERAL VIEWS OF THE DRAWING(S)

DETAILED DESCRIPTION OF THE INVENTION

This detailed description, with reference to the accompanying drawings, discusses illustrative embodiments of an inventive concept, specifically a portable nested cook-set defined by a portable cook pot having one or more cooperating food or beverage preparation and/or food or beverage storage elements nested therein, such as a press-pot piston and/or a storage container, such as a specifically adapted vacuum bottle. This detailed description is provided to give persons having ordinary skill in the relevant art a full, clear, concise, and exact description of this inventive concept, and to enable such persons to appreciate and understand how to make and use embodiments of the conceptual portable nested cook-set, including not only the explicitly described illustrative embodiments but also, by inference and implication, all other embodiments that fall within the scope of the inventive concept, despite those embodiments not being explicitly described below.

Certain aspects of the conceptual portable nested cook-set are defined by a cook pot, having a pot sidewall having a retention projection and defining an upwardly opening pot interior chamber, a press-pot piston having a piston sidewall and a bottom side defining an upwardly opening piston interior chamber, and a storage container having an exterior portion and a selectively sealable interior storage chamber. The press-pot piston has an open top end, a bottom side having a bottom opening with a screen disposed therein, and the sidewall has a sidewall opening and a retention notch positioned to removably receive the retention projection therein. The press-pot piston sidewall has an outer surface dimensioned to be selectively storable at least partially within the pot interior chamber. A sealing ring extends about the outer surface the piston sidewall, between the sidewall opening and the bottom opening. The piston sidewall also has interior threading and the storage container has an exterior portion having a lower portion dimensioned to be selectively storable at least partially within the piston interior chamber, the exterior portion having threading threadably engageable with the interior threading of the piston sidewall.

Among the several advantages of the conceptual portable nested cook-set, as will be discussed in greater detail herein with respect to the presently described embodiments, is that a user may disassemble the elements of the cook-set, prepare and consume food or a beverage such as coffee, tea, etc. using the cook pot and the press-pot piston, if desired, decant any remaining food or beverage into the storage container, seal the storage container, and then reassemble the storage container, press-pot piston and cook pot into a single unit for convenient and compact storage and transportation. As is described below, the press-pot may be adapted to be utilized as a "traditional French-press" and/or as a "reverse French-press."

Figure 1:
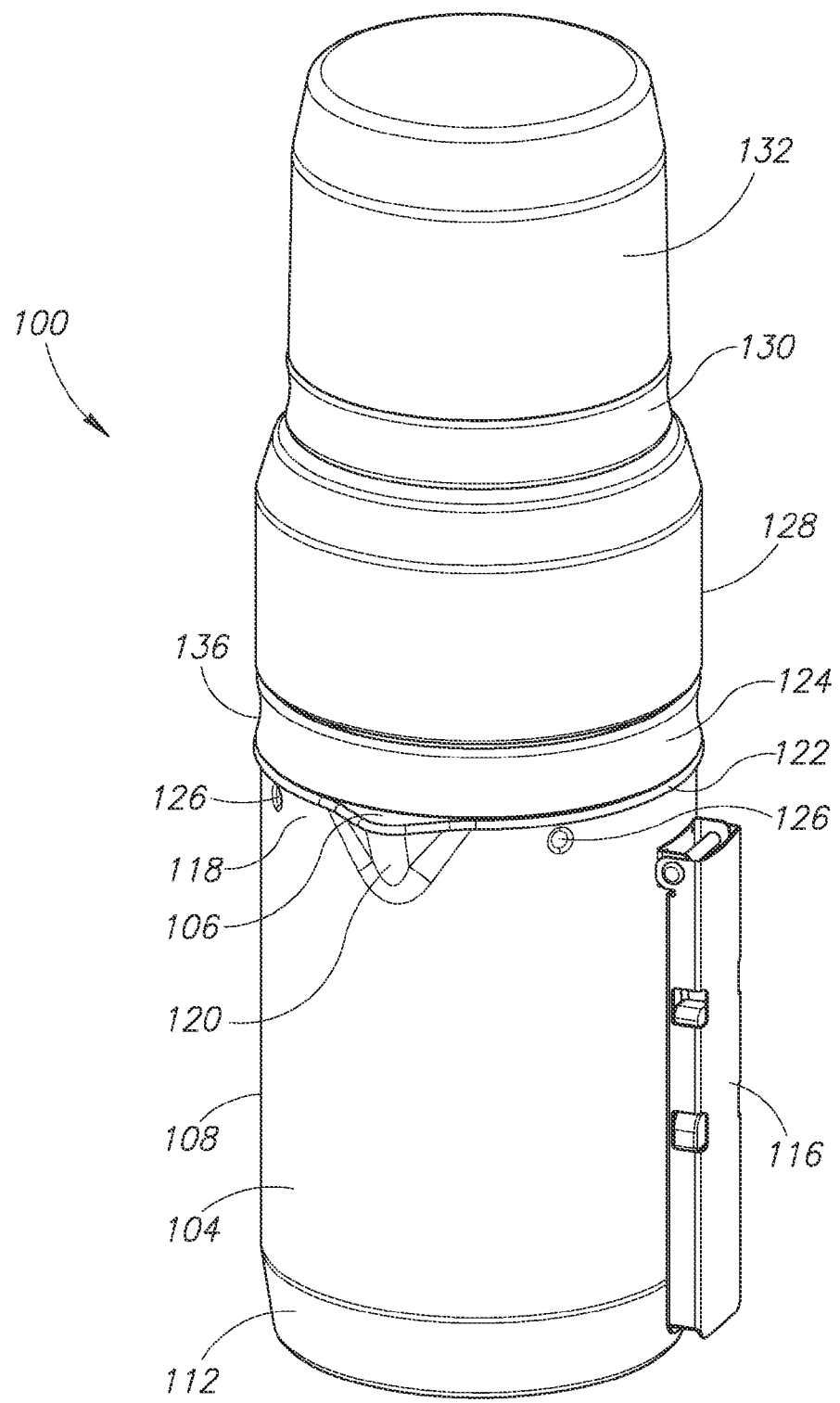
FIG. 1 is a front perspective view of a portable nested cook-set having a cook pot with a foldable handle, a press-pot piston nested within the cook pot, and a vacuum bottle nested within the press-pot piston, embodying certain aspects of the present invention.
Figure 3:
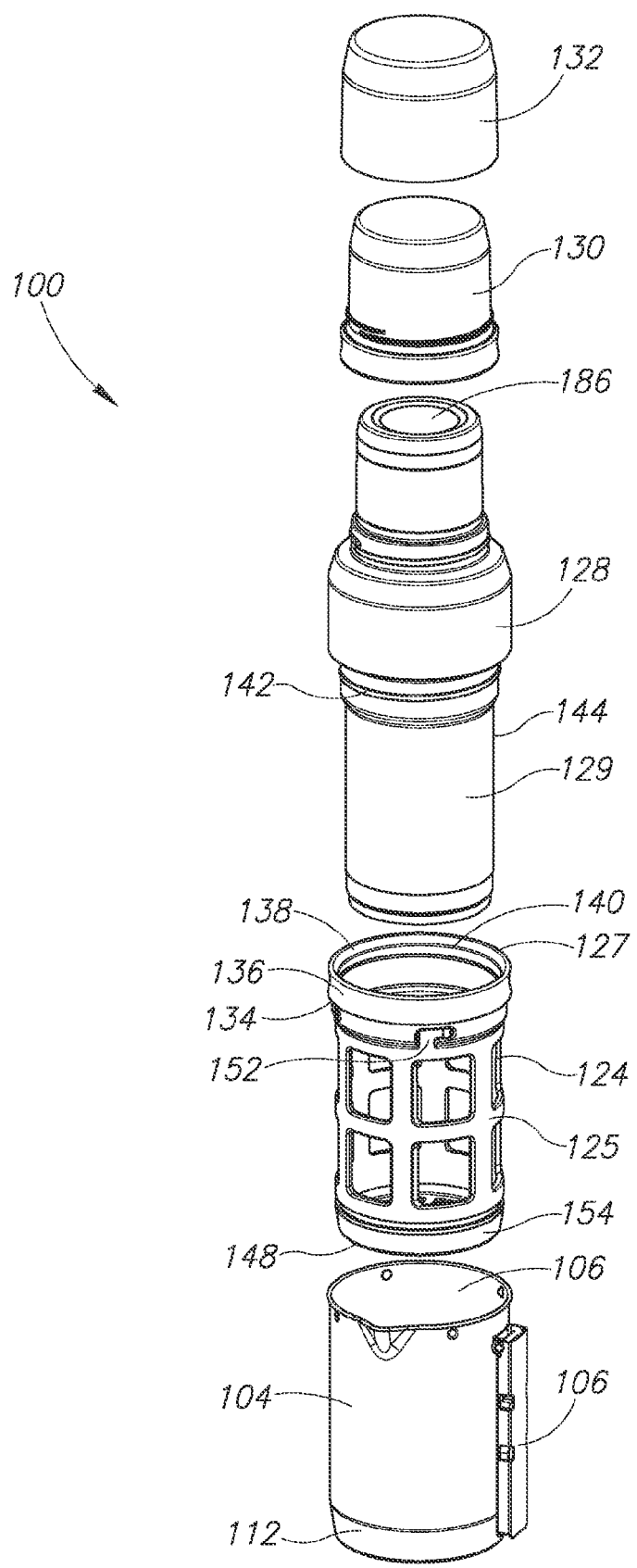
FIG. 3 is a front exploded perspective view of the nested cook-set of FIG. 1.

Turning now to the presently described non-limiting, first exemplary embodiment of the conceptual portable nested cook-set and the accompanying drawings, FIG. 1 illustrates such a portable nested cook-set, generally indicated by reference numeral 100. The cook-set 100 includes a cook pot 104 having an open upper end 106, a generally cylindrical body 108 and a tapered thermally conductive base 112. A foldable handle 116 is affixed to the side of the cook pot body 108. The cook pot body 108 has an upper portion 118 formed with a spout 120 and a lip 122 for supporting a press-pot piston 124 when the press-pot piston is positioned within the cook pot body 108 and extending upward through the open upper end 106 of the cook pot. As is described in more detail below, a plurality of inwardly projecting retention projections 126 project into the interior of cook pot 104 for selectively locking the press-pot piston 124 within the cook pot 104. The retention projections 126 are formed in the upper portion 118 of the cook pot, at a location below the lip 122. As shown in FIG. 3, the press-pot piston 124 has a generally cylindrical body 125 and an open upper end 127 which is sized to receive a lower portion 129 of a vacuum bottle 128 in the body 125 and extending upward through the open upper end 127. The vacuum bottle 128 has an inner cup 130 and an outer cup 132 removably attached thereto. The press-pot piston 124 is selectively positionable within the cook pot 104, and the vacuum bottle 128 is selectively positionable within the press pot piston 124, all in concentric, coaxial nested arrangement along a common axis, for storage and carrying of the portable nested cook-set 100.

Figure 2:
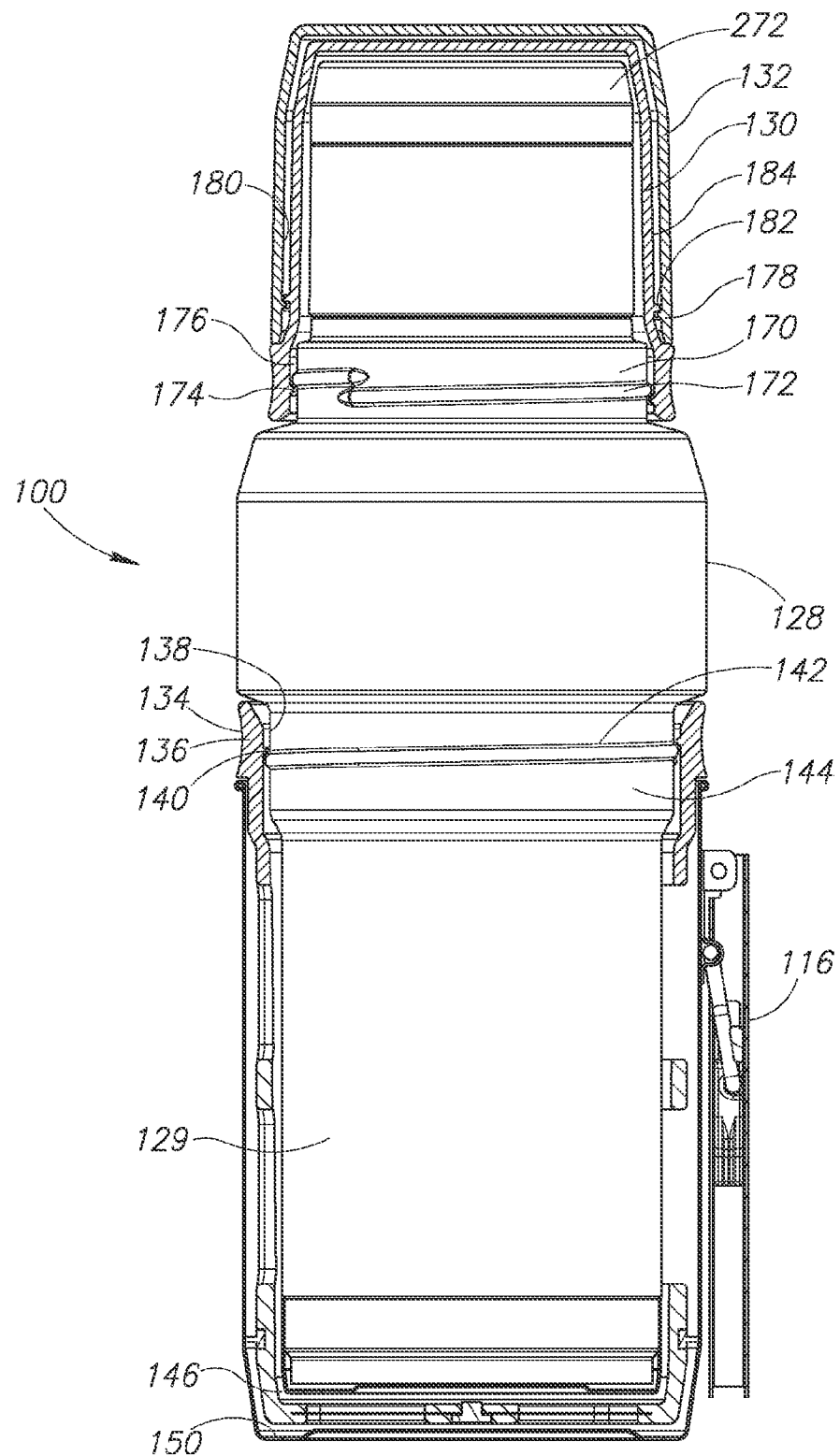
FIG. 2 is a partial cross-sectional view of the nested cook-set of FIG. 1.

FIGS. 2 and 3 illustrate the nesting relationship of the cook pot 104, the press-pot piston 124, and the vacuum bottle 128. The cook pot 104 may be any size that is suitable for its intended purpose. For example, various backpacking cook pots, which must balance cooking capacity against the amount of space the cook pot takes up when not in use, typically have interior volumes ranging from half a quart to two quarts. The cook pot 104 may be similar to a conventional camping cook pot in terms of its general structure and function and may be made of any suitable material, i.e., a material that is relatively strong, lightweight, thermally conductive, and resistive to heat and corrosion, typically metal, for example aluminum, stainless steel, or titanium. The press-pot piston 124 is dimensioned to fit snuggly within the interior of the cook pot 104, to receive the lower portion 129 of the vacuum bottle 128 within the body 125 of the press-pot, and to allow the proper functioning of the press-pot, as is described below. The press-pot piston 124 may be made using any suitable material and manufacturing method, such as injection molded plastic. An upper portion 134 of the press-pot piston 124 has an annular rim portion 136 defining the open upper end 127 of the press-pot piston with an interior sidewall 138 having interior threads 140 for threadably engaging with exterior treads 142 on a lower neck portion 144 of the vacuum bottle 128 and thereby selectively detachably securing the vacuum bottle within the press-pot piston. The vacuum bottle 128 may be similar to a conventional vacuum bottle with respect to its interior structure and function while being advantageously dimensioned along its lower portion 129 such that it may nest within press-pot piston 124.

As is also described in more detail below with reference to FIGS. 7 through 15, a user may remove the vacuum bottle 128 from within press-pot piston 124 and then remove the press-pot piston from within the cook pot 104. The cook pot 104 may then be filled with water or other fluid and exposed to heat, such as by placing the cook pot on a conventional camping stove or other source of flame or heat. When the contents of cook pot 104 have reached a sufficient temperature, the user may elect to add food material such as tea leaves or ground coffee beans to the fluid in the cook pot 104. Steeping in the fluid within cook pot 104 will cause the food material to impart flavor and other desirable characteristics to the fluid. The user may then use the press-pot piston 124 to filter out the food material, e.g. by forcing it to an interior bottom portion 146 of the cook pot 104 (as shown in FIG. 10) located between a lower end portion 148 of the press-pot piston 124 and an interior bottom wall 150 of the cook pot 104. The strained liquid may then be poured out of cook pot 104, for instance into the vacuum bottle 128, or into the inner cup 130 and/or the outer cup 132 of the vacuum bottle, while the food material remains in the cook pot 104, trapped below the lower end portion 148 of the press-pot piston 124. The portable nested cook-set 100 may then be reassembled into the configuration shown in FIG. 1 for transportation and storage.

Figure 4A:
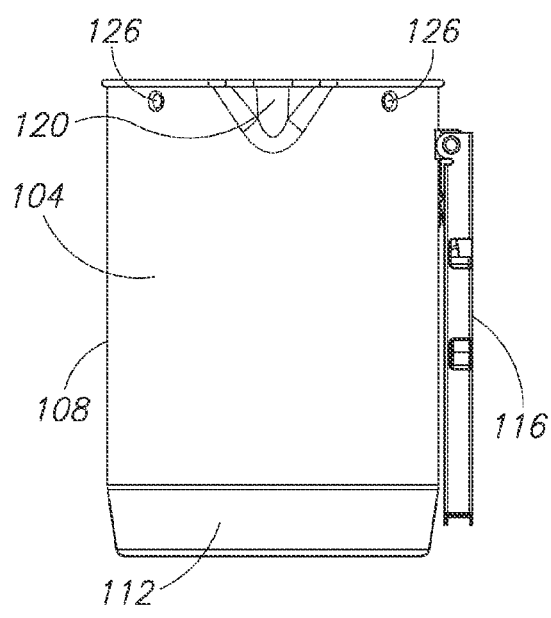
FIG. 4A is a front elevational view of the cook pot of FIG. 1 with the foldable handle in a closed position.
Figure 4B:
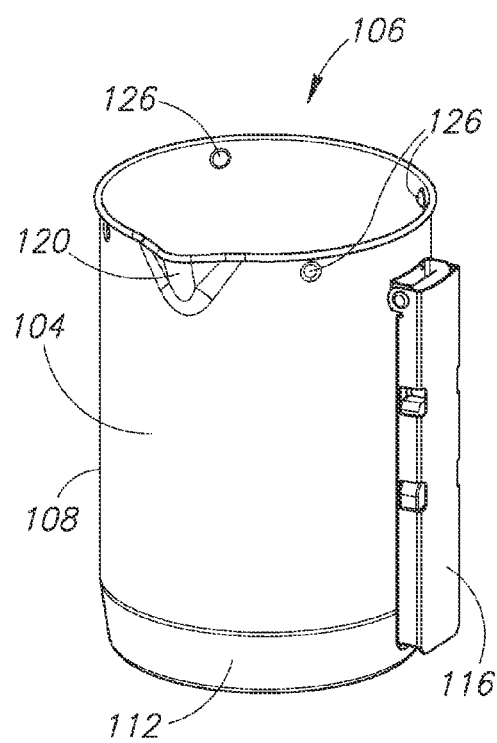
FIG. 4B is a front perspective view of the cook pot of FIG. 4A.
Figure 8:
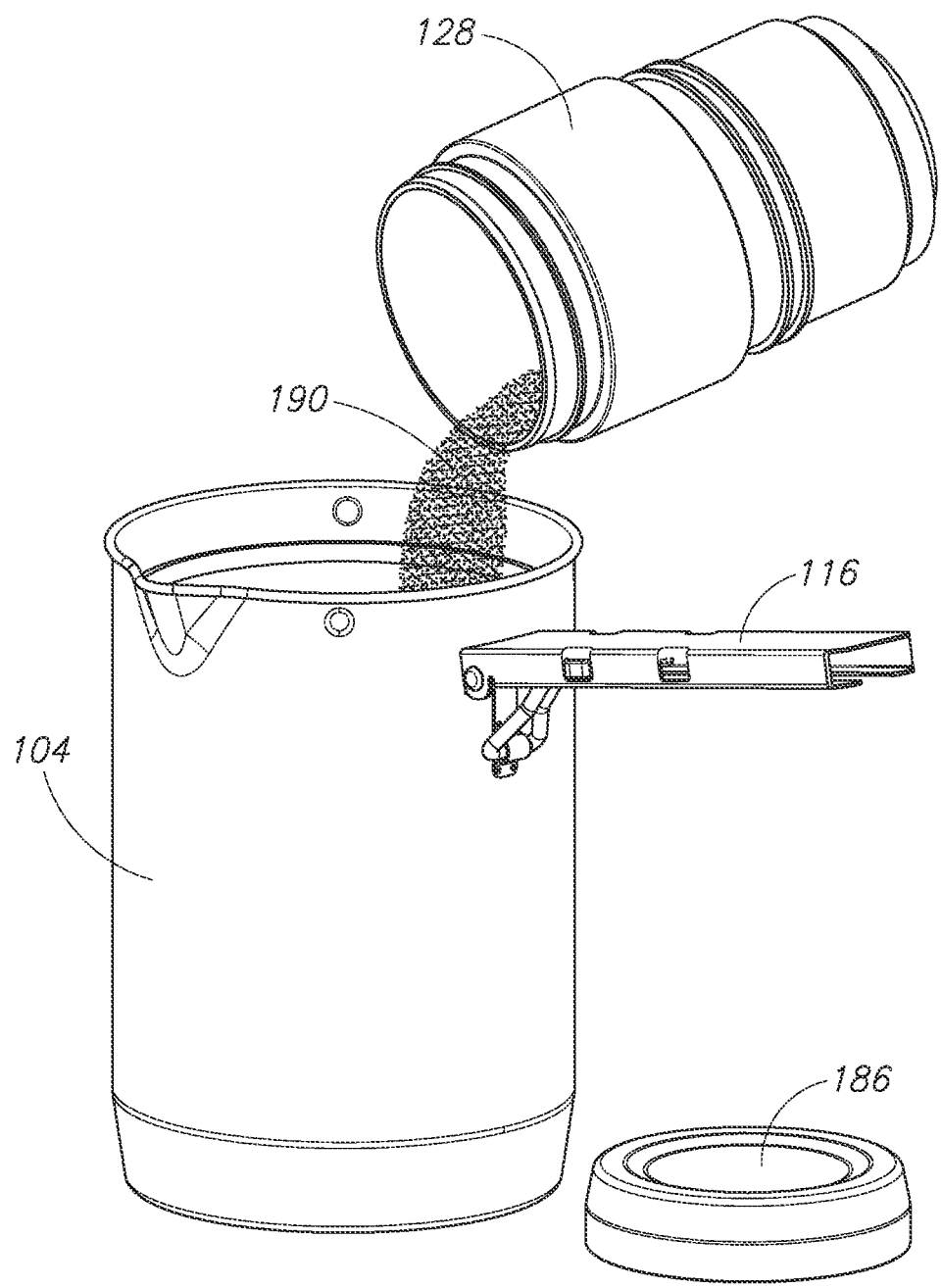
FIG. 8 is a front perspective view of the cook pot of FIG. 1 being used in a second step of the method of using the nested cook-set to make coffee, showing ground coffee being poured into the cook pot from its storage in the vacuum bottle of FIG. 1.

FIGS. 4A and 4B illustrate aspects of cook pot 104. The bottom diameter of tapered base 112 of the cook pot 104 may advantageously be selected to be compatible with one or more commercially available backpacking stoves or other standard heat sources (e.g., see FIG. 8). The height of the cook pot body 108 may then be chosen based on the diameter of the base 112 and the desired interior volume, as well as with consideration to the other components of the combination cook-set 100, i.e., the press-pot piston and vacuum bottle. The handle 116 is affixed to the body 108 adjacent to the open upper end 106 of the cook pot 104. To facilitate safe handling and pouring of the cook pot 104 and its contents, the handle 116 may advantageously be affixed to the body 108 at a location approximately 90 degrees laterally offset from the spout 120. The handle 116 is movable between, and automatically lockable in, a folded position, as is shown in FIGS. 4A and 4B, and an open position, as is shown in FIG. 8. The retention projections 126 of the body 108 project inwardly and cooperate with retention notches 152 formed in the upper portion 134 of the press-pot piston 124 at locations just below the annular rim portion 136 and described in greater detail below (as shown in FIGS. 5a and 5B) to selectively, detachably secure the press-pot piston inside cook pot 104.

Figure 5A:
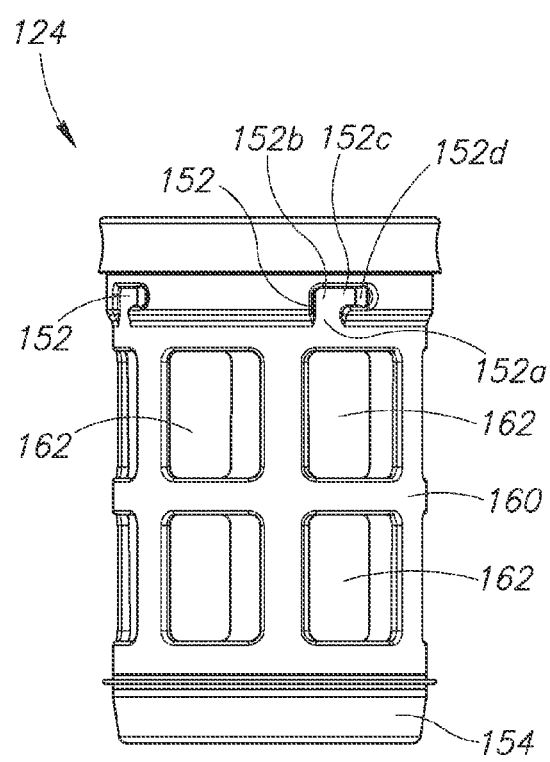
FIG. 5A is a front elevational view of the press-pot piston of FIG. 1.
Figure 5B:
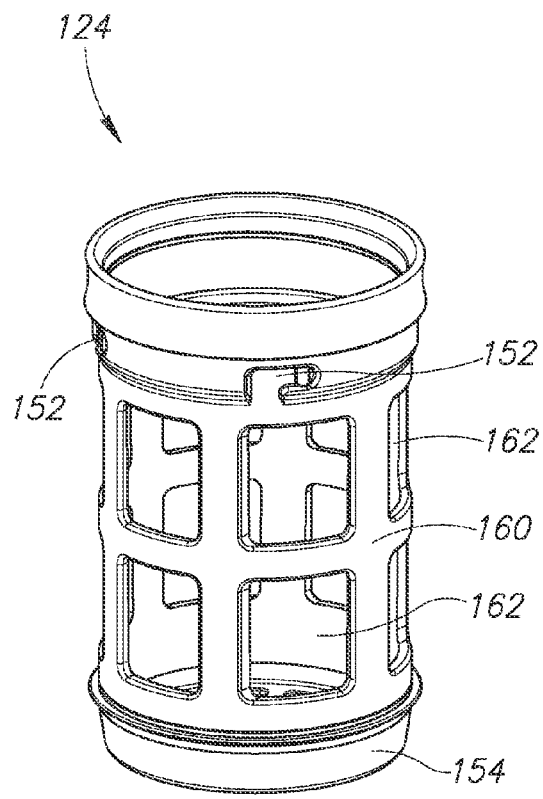
FIG. 5B is a front perspective view of the press-pot piston of FIG. 5A.
Figure 10:
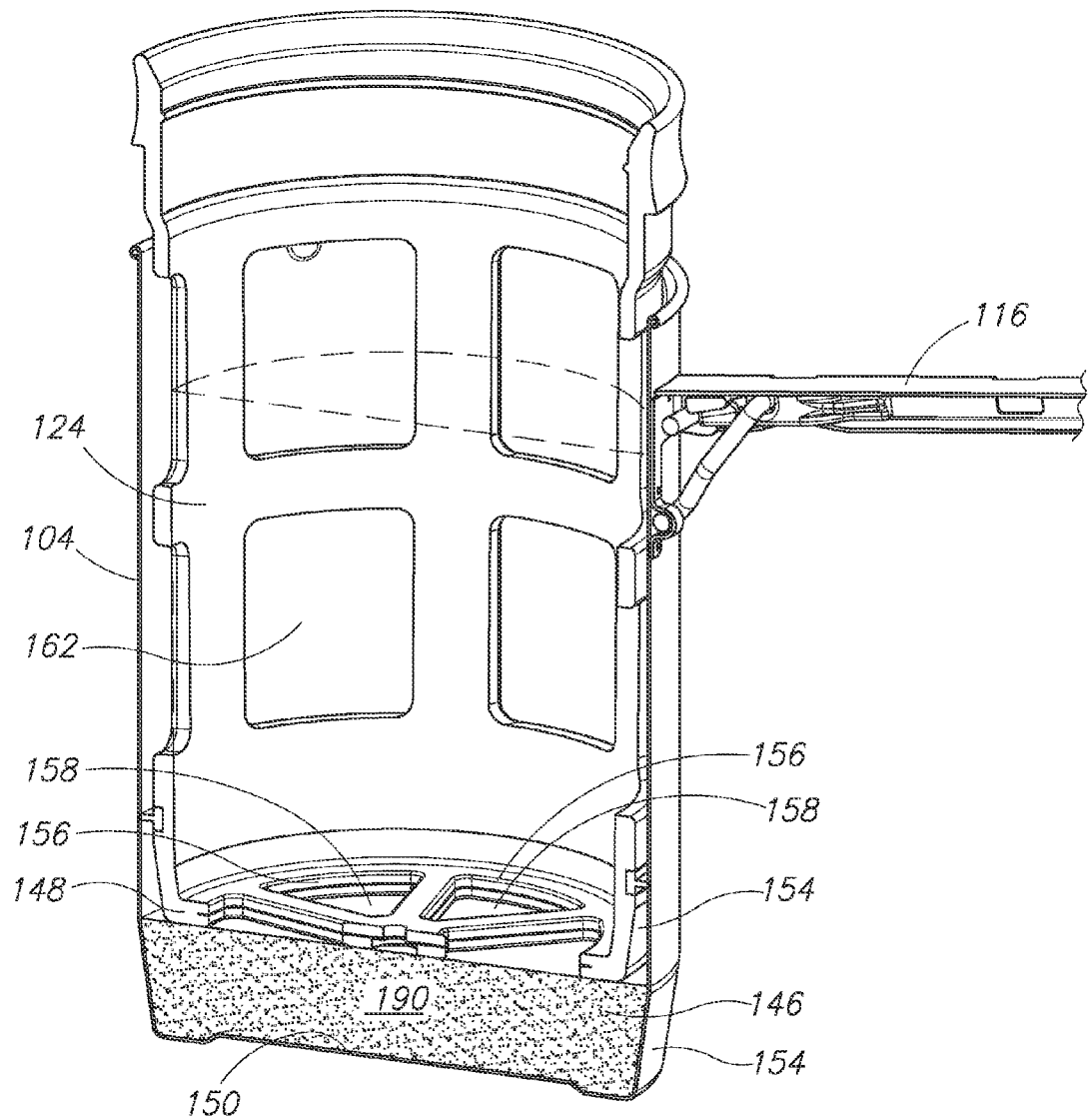
FIG. 10 is a cross-sectional view of the cook pot of FIG. 1 in a final position of the third step of the method of using the nested cook-set to make coffee, showing the press-pot piston fully inserted into the cook pot and forcing the ground coffee to the bottom of the cook pot.
Figure 11:
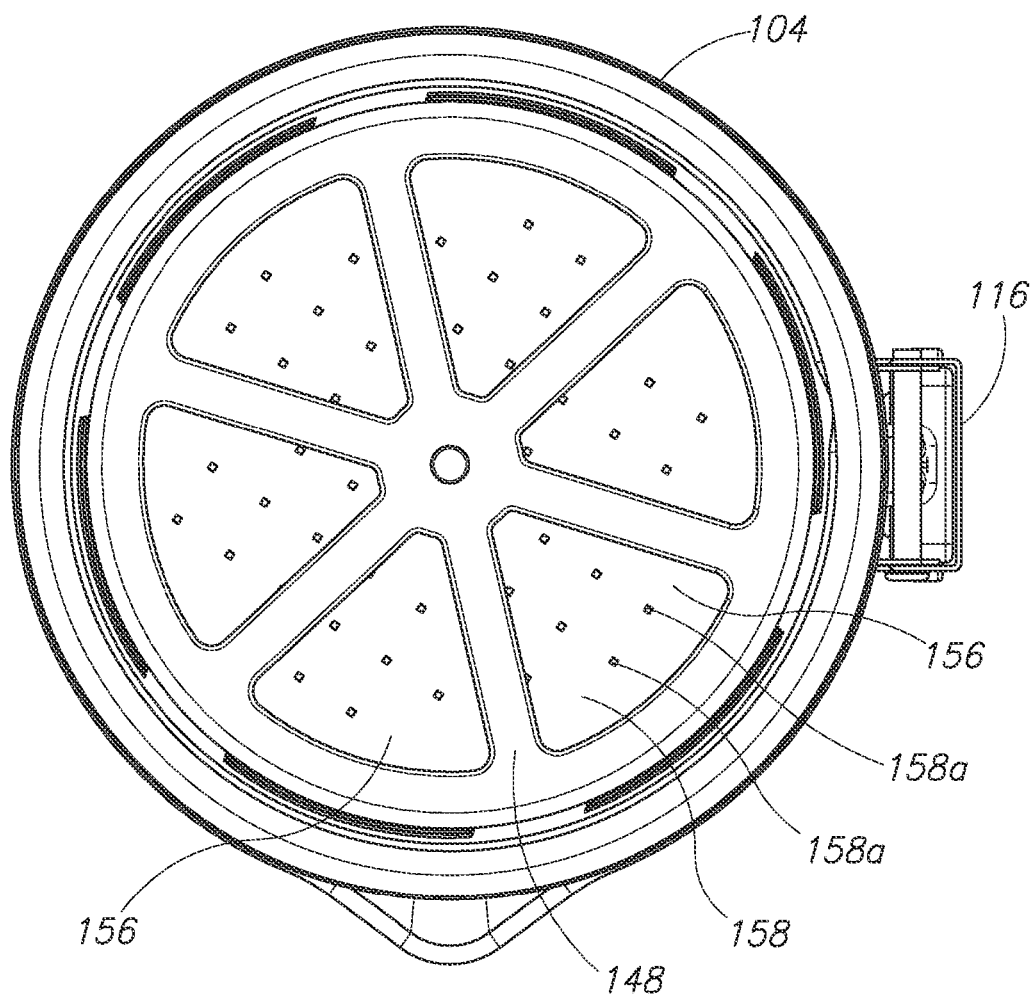
FIG. 11 is a top plan view of the cook pot and fully insertedpress-pot piston of FIG. 10.

FIGS. 5A and 5B illustrate aspects of the press-pot piston 124. The press-pot piston 124 is formed with a lower portion 154, having a tapered exterior generally matching the interior tapering of the tapered base 112 of the cook pot 104. As is best illustrated in FIGS. 10 and 11, a plurality of screened openings 156 are formed in the lower end portion 148 of the press-pot piston 124, each screened opening having a filtering screen 158 spanning across the screened opening, such as a thin nylon mesh. In use, the filtering screen 158 serves the conventional role of allowing fluid to pass through the screened opening while preventing food material from passing through as the press-pot piston is moved downward through the cook pot 104 towards the base 112.

The retention notches 152 are L-shaped and each define a downwardly oriented opening 152a leading to an upwardly extending access channel 152b. A locking channel 152c extends circumferentially from the access channel 152b. A longitudinal side of the locking channel 152c has an inwardly curved lip 159, decreasing the width of the locking channel at the interface with the access channel 152b. The retention notches 152 work cooperatively with the inwardly projecting retention projections 126 of the cook pot 104 to selectively lock press-pot piston 124 within the interior of the cook pot. Advantageously, the inwardly curved lip 159 causes the width of the locking channel 152c to be less than the width of the retention projection 126 at the locking channel's interface with the access channel 152b, and to be greater than the width of the retention projection at a close end portion 152d of the locking channel spaced away from the interface.

As is best seen in FIG. 2, the upper portion 134 of the press-pot piston 124 having the retention notches 152 formed therein is dimensioned to fit within the interior of the upper portion 118 of the cook pot 104, and the annular rim portion 136 of the press-pot piston 124 is dimensioned to rest on top of the lip 122 of the cook pot.

Also shown in FIGS. 5A and 5B, a frame 160 extends between the lower and upper portions 154 and 134, respectively, of the press-pot piston 124. The frame 160 is formed with a plurality of side openings 162. Below the side openings 162 and above the lower end portion 148 of the press-pot piston 124, an annular sealing ring 164 encircles the outer circumference of the frame 160 at a location above tapered exterior of the lower portion 154 of the press-pot piston 124. In use, as is described in more detail below with reference to FIG. 10, the annular sealing ring 164 and the screened opening 156 divide the interior of the cook pot 104 into an unfiltered volume outside of the press-pot piston 124 below the annular sealing ring and a filtered volume inside of the press-pot piston and outside of the press-pot piston above the annular sealing ring. In use, as the press-pot piston 124 is moved downward through the fluid in the cook pot 104 toward the base 112 of the cook pot, the side openings 162 permit the filtered fluid inside of the press-pot piston to flow freely to the outside of the press-pot piston above the annular sealing ring.

Figures 6A, 6B:
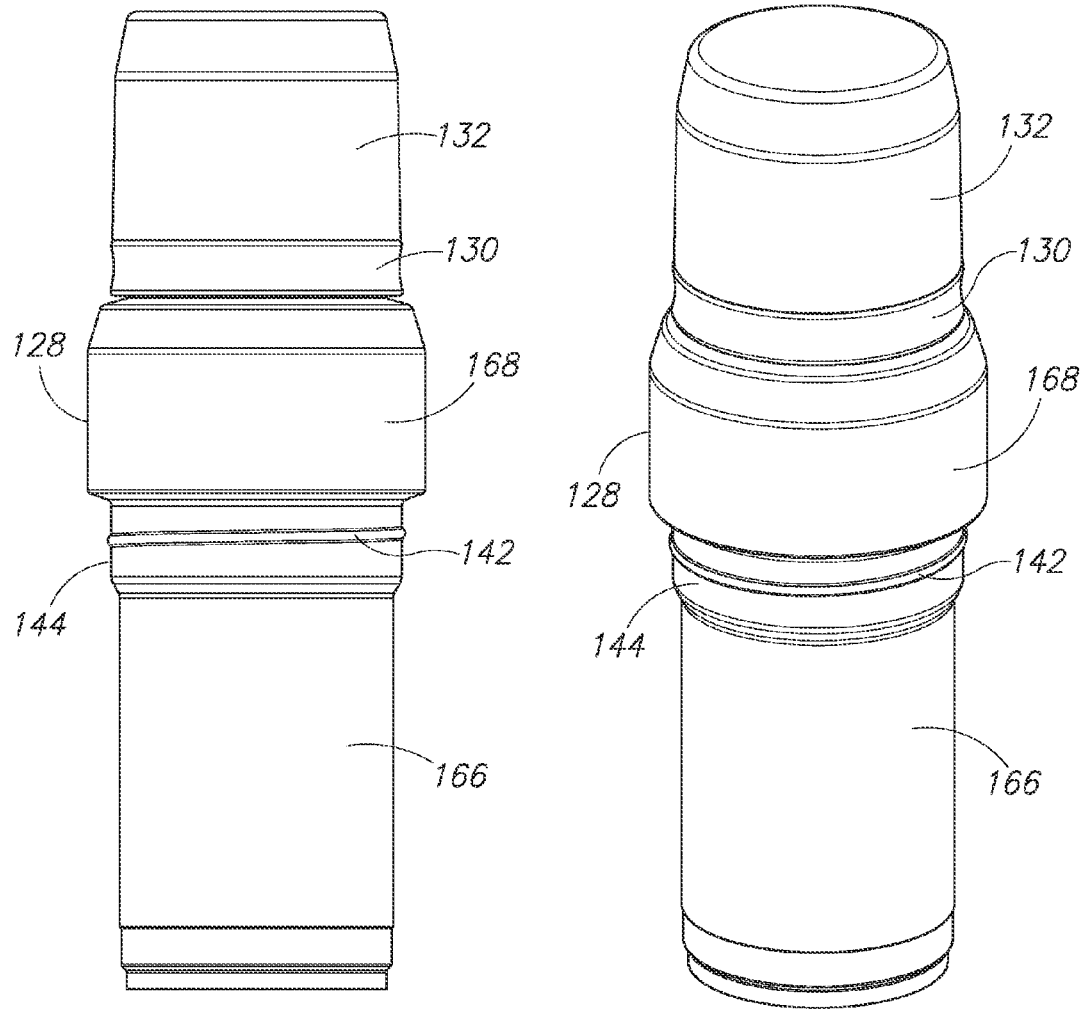
FIG. 6A is a front elevational view of the vacuum bottle of FIG. 1.
FIG. 6B is a front perspective view of the vacuum bottle of FIG. 6A.

FIGS. 6A and 6B illustrate the vacuum bottle 128. The vacuum bottle 128 includes a cylindrical body 166 with the lower portion 129 thereof dimensioned to extend through the open upper end 127 of the press-pot piston 124 and fit somewhat snuggly within its interior, with a lower end of the vacuum bottle adjacent to the inner side of the lower end portion 148 of the press-pot piston and the threads 142 of the lower neck portion 144 of the vacuum bottle threadably engaging the threads 140 of the interior surface 138 of the annular rim portion 136 of the press-pot piston. An upper portion 168 of the vacuum bottle 128 is dimensioned to correspond to the relatively larger outer diameter of the annular rim portion 136 of the press-pot piston 124 and of the lip 122 of the cook pot 104. Now referring also to FIG. 2, the upper portion 168 of the vacuum bottle 128 extends between the threaded lower neck portion 144 and an upper threaded neck portion 170 having exterior threads 172. The inner cup 130 is removably attached to the vacuum bottle 128 using threads 172 by complementary interior threads 174 formed on an inner sidewall 176 of the inner cup 130. The outer cup 132 may be removably attached to the inner cup 130 using an inner lip 178 formed on an inner sidewall 180 of the outer cup which is snap fitted to an outer lip 182 formed on an outer sidewall 184 of the inner cup. A removable cap 186 selectively seals a top opening of the vacuum bottle 128 which provides access to the vacuum bottle's interior.

Figure 7:
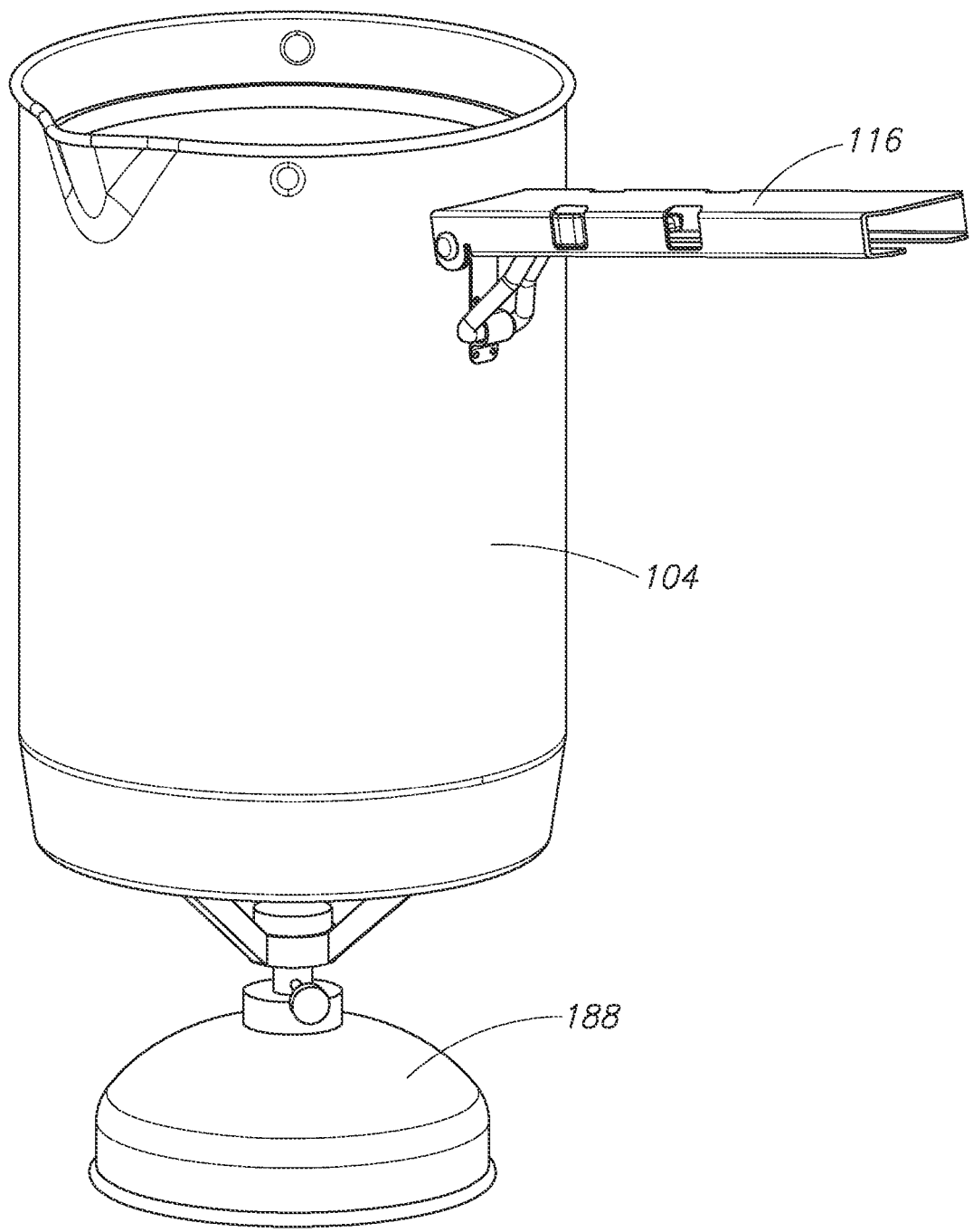
FIG. 7 is a front perspective view of the cook pot of FIG. 1 being used in a first step of a method of using the nested cook-set to make coffee, showing water being heated and the handle in an opened position.

FIGS. 7 through 15 illustrate in greater detail a preferred method of operation of the portable nested cook-set 100 described above with reference to FIGS. 1 through 6B. Referring to FIG. 7, after removing the press-pot piston 124 and the vacuum bottle 128 from the cook pot 104, a user may move the cook pot's handle 116 to the open position, where it automatically locks in place.

The user may then fill the cook pot with a fluid, typically water, and place the cook pot over a heat source, such as a conventional back-packing stove 188 or an open flame. The user may then let the contents of cook pot 104 heat to a sufficient temperature for the intended purpose, such as just below boiling.

Referring now to FIG. 8, if the user desires to make a steeped beverage such as coffee or tea, the user may then remove the cook pot 104 from the heating source and pour an appropriate amount of food material 190 such as coffee or tea into the cook pot. The food material 190 should then be allowed to steep in the heated water, imparting flavor and other properties thereto. If desired, the food material 190 may be carried in the vacuum bottle 128 premeasured as the amount desired for one use of the cook pot 104 to avoid the need to carry a separate container for the food material.

Figure 9:
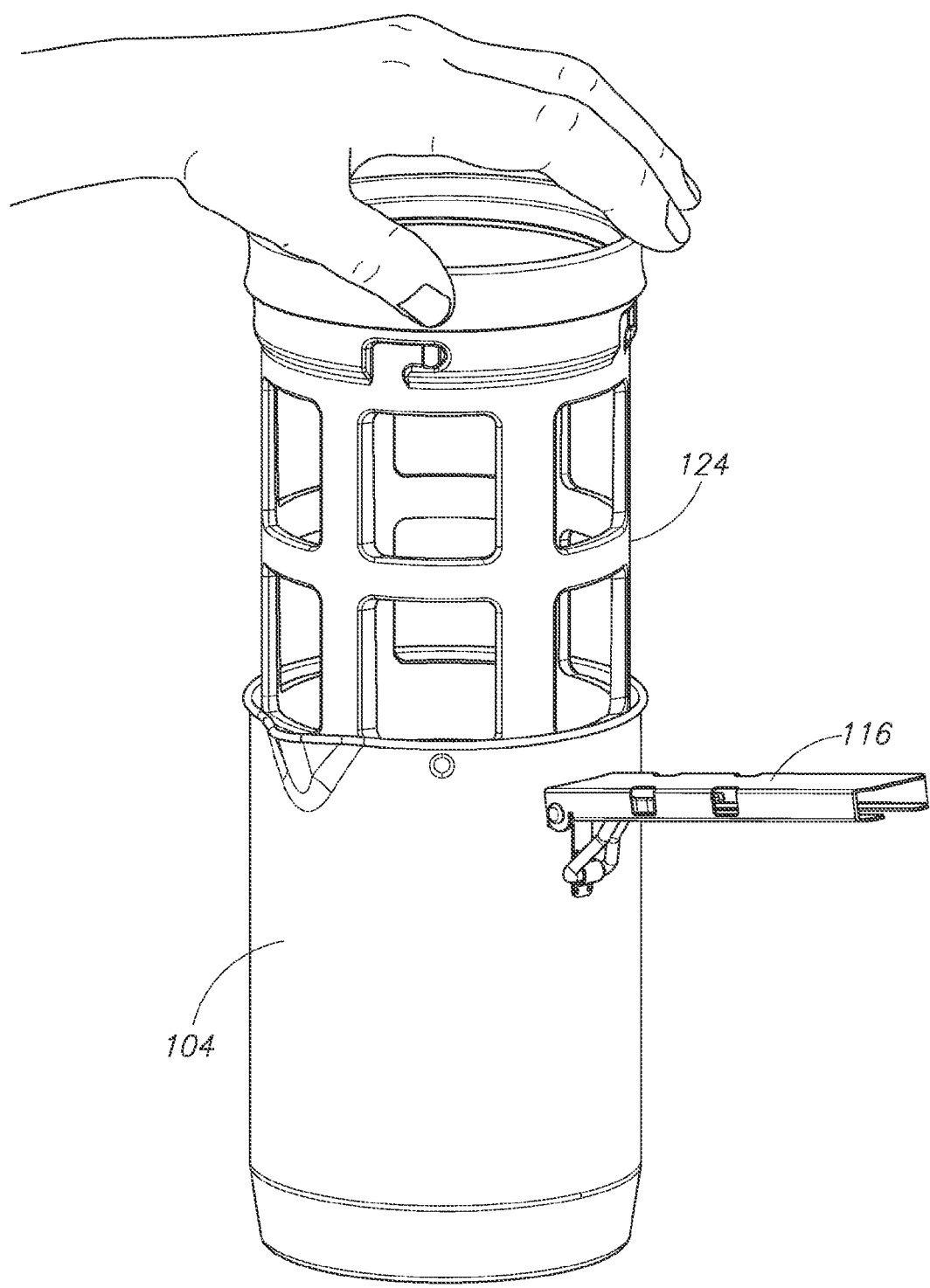
FIG. 9 is a front perspective view of the cook pot of FIG. 1 being used in a third step of the method of using the nested cook-set to make coffee, showing the press-pot piston of FIG. 1 being inserted into the cook pot.

Referring now to FIG. 9, after allowing the heated water and food material 190 to steep for an appropriate period of time, the user may position the press-pot piston 124 over the open upper end 106 of the cook pot 104, and then insert the lower portion 154 of the press-pot piston into the open upper end of the cook pot.

Referring now to FIGS. 10 and 11, the user should next gradually press downward on the press-pot piston 124, allowing the lower end portion 148 of the press-pot piston, the filtering screens 158, and annular sealing ring 164 to push the food material 190 within the fluid in the cook pot 104 towards the base 112 of cook pot. The filtering screens 158 each have a plurality of apertures 158a (some being shown enlarged in FIG. 11 for purposes of illustration) which permit fluid to flow through the filtering screen into the filtered volume inside of the press-pot piston 124 as well as then through the side openings 162 to the outside of the press-pot piston above the annular sealing ring 164, while blocking the movement of the food material 190. Generally, the press-pot piston is moved to position the lower end portion 148 of the press-pot piston 124 adjacent to the base 112 of the cook pot 104, trapping the food material 190 trapped therebetween.

Figure 12:
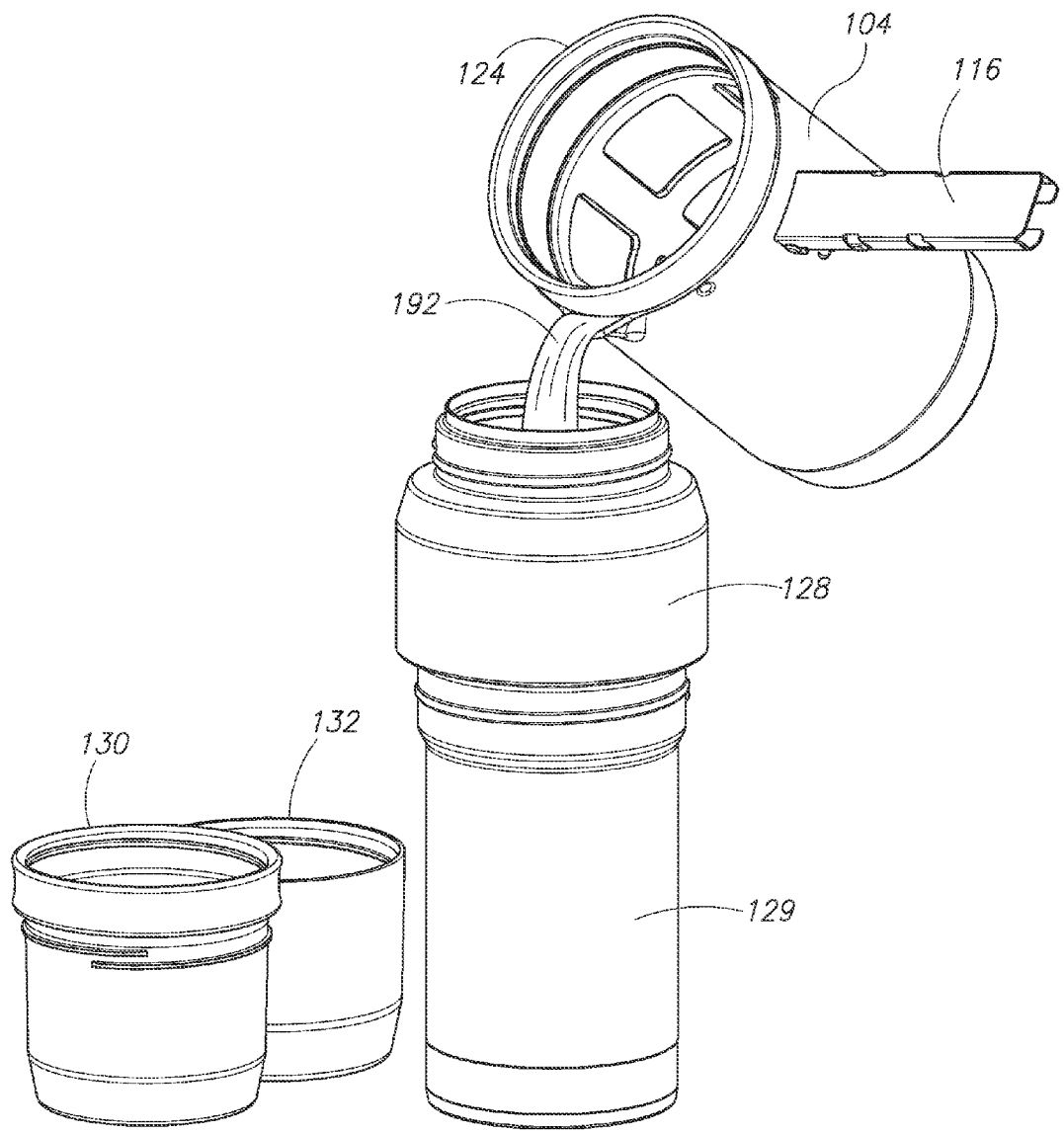
FIG. 12 is a front perspective view of the cook pot of FIG. 1 being used in a fourth step of the method of using the nested cook-set to make coffee, showing the press-pot piston fully inserted into the cook pot and holding the ground coffee to the bottom of the cook pot while the cook pot is tilted to pour the brewed coffee drink in the cook pot into the vacuum bottle.

Referring now to FIG. 12, the user may then pour the filtered fluid 192 of cook pot 115804 into a container, such as the vacuum-bottle 128, the inner cup 130, the outer cup 132, and/or any other suitable container. As the filtered fluid 192 is poured, the openings 162 in press-pot frame 160 permit the filtered fluid inside of the press-pot piston 124 to flow outward to the space between the press-pot piston and interior wall of the cook pot 104, and then to the spout 122 of the cook pot.

Figure 13:
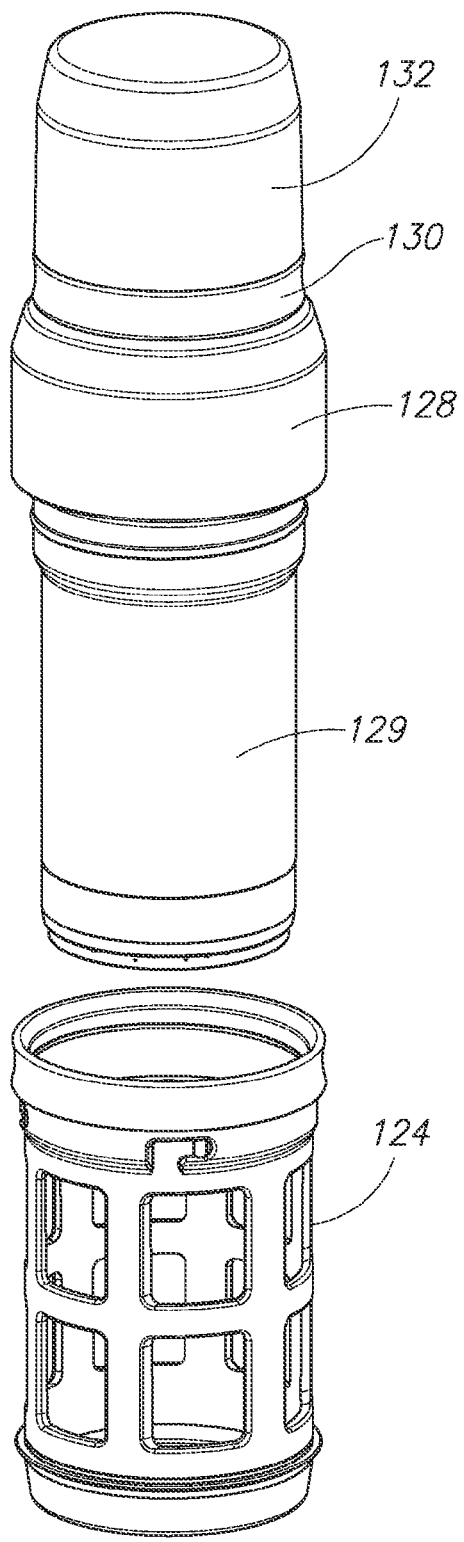
FIG. 13 is a front perspective view of the vacuum bottle and the press-pot piston in a first step of a method of re-assembling the nested cook-set of FIG. 1, showing the vacuum bottle in position to be inserted into the press-pot piston.

The press-pot piston 124 may then be removed from the cook pot 104 and cleaned. Referring now to FIG. 13, the vacuum bottle 128 can then be inserted into press-pot piston 124 and secured therein via cooperative threads 140 and 142 on the interior sidewall 138 of the annular rim portion 136 of the press-pot piston and the lower neck portion 144 of the vacuum bottle, respectively, as shown in FIG. 14.

Figure 14:
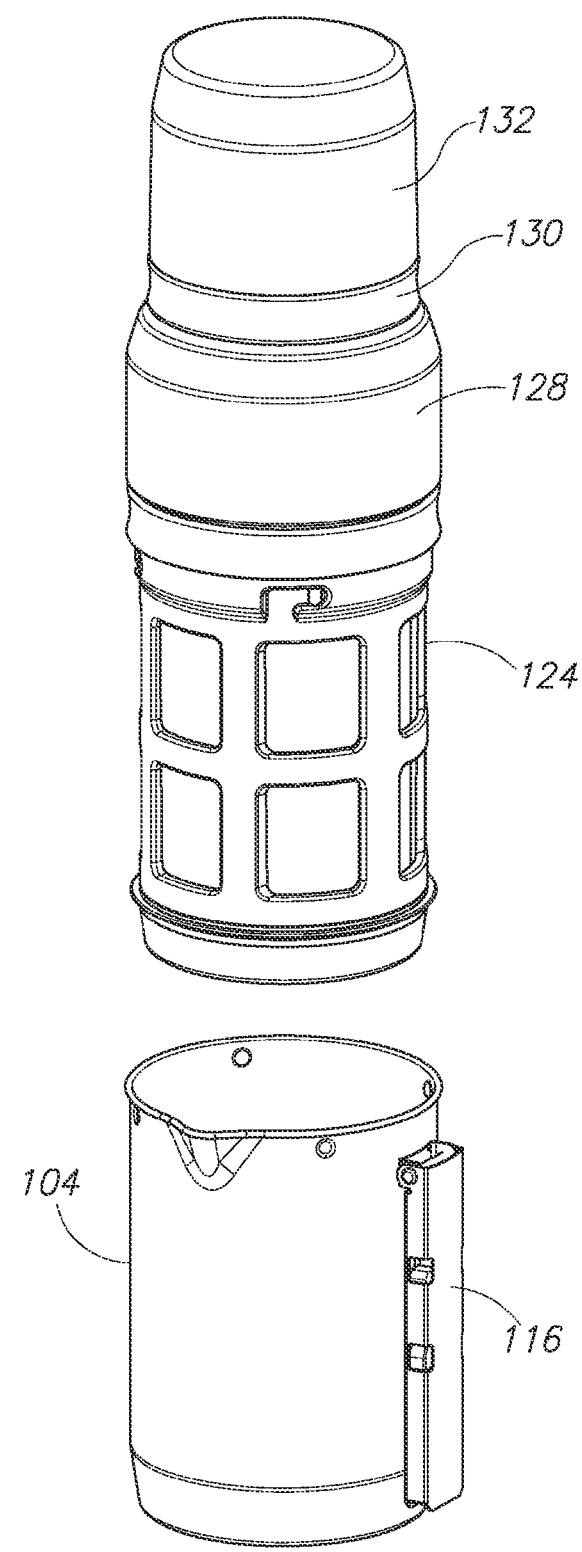
FIG. 14 is a front perspective view of the vacuum bottle, press-pot piston and cook pot in a second step of the method of re-assembling the nested cook-set of FIG. 1, showing the vacuum bottle fully inserted into press-pot piston and the combination in position to be inserted into the cook pot.
Figure 15:
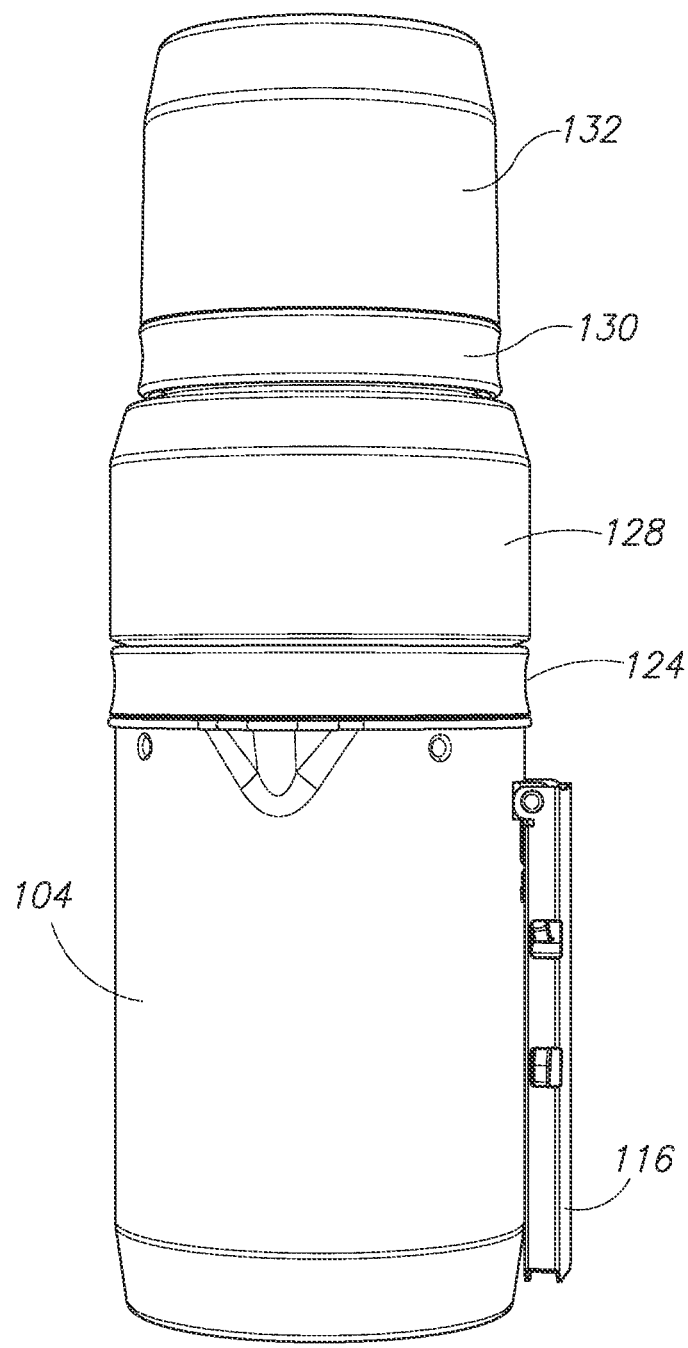
FIG. 15 is a front elevational view of the vacuum bottle, press-pot piston and cook pot in the final position of the method of re-assembling the nested cook-set of FIG. 1, showing the nested cook-set fully re-assembled and ready for storage and transport in a compact arrangement.

Referring now to FIGS. 14 and 15, with or without the vacuum bottle 128 secured within the press-pot piston 124, the press-pot piston can be inserted into and secured within cook pot 104. The lower end portion 148 of the press-pot piston 124 is first inserted into the open upper end 106 of the cook pot 104. The openings 152a of the retention notches 152 on the upper portion 134 of the press-pot piston 124 are aligned with inwardly projecting retention projections 126 on the interior of the body 108 of the cook pot 104, and the press-pot piston is moved downwards relative to the cook pot such that retention projections pass into and through the access channel 152b of the corresponding retention notch and are positioned at the beginning of the locking channel 152c for the corresponding retention notch. The press-pot piston 124 can then be twisted relative to cook pot 104 such that each retention projection 126 will be urged to move circumferentially through the locking channel 152c of the corresponding retention notch 152. If sufficient twisting force is applied, the retention projection 126 will elastically deform the inwardly curved lip 159 of locking channels 152c. After the press-pot piston 124 rotates sufficiently for the retention projection 126 to pass by the inwardly curved lip 159 and enter the portion of locking channels 152c having a width greater than the width of the retention projection, the deformed lip 159 of locking channel 152c will return to its original configuration and releasably retain the press-pot piston in position within the cook pot. Interference between retention projections 126 and the inwardly curved lips 159 of the locking channel will prevent longitudinal and reverse rotational movement of press-pot piston (and vacuum bottle, if present) relative to cook pot, unless sufficient rotational force is applied to cause the retention projections to deform the inwardly curved lips located between the locking channels and the access channels.

The order of reassembly of the component parts of the combination cook pot 100 may be reversed if desired.

Figure 16:
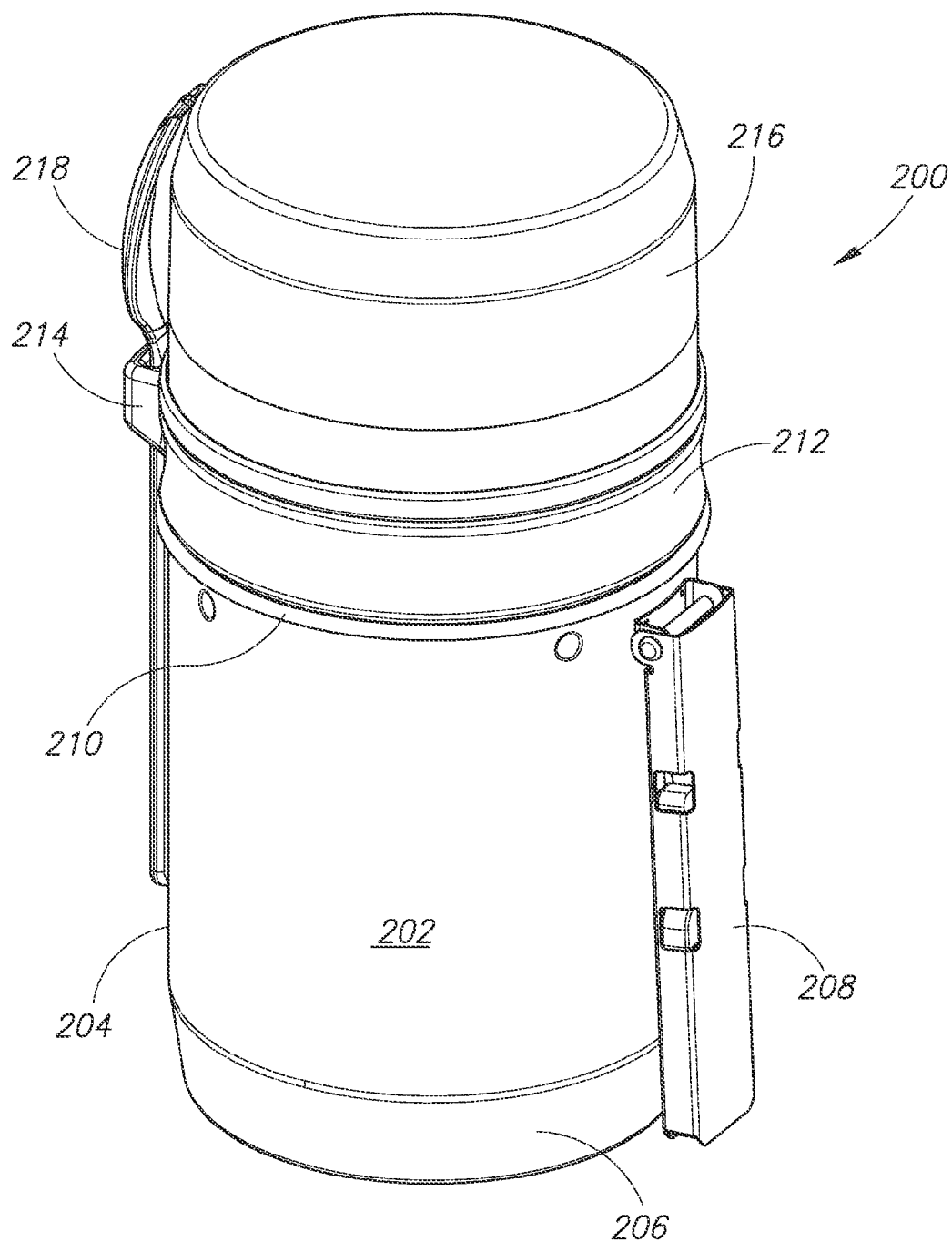
FIG. 16 is front perspective view of an alternative portable nested cook-set having a cook pot with a foldable handle, a vacuum bottle nested within the cook pot and an eating utensil retained by a support clip, embodying certain aspects of the present invention.

From the foregoing it will be appreciated that, although specific embodiments of the inventive concept have been described herein for purposes of illustration, various modifications to both the described apparatus and its method of use may be made without deviating from the spirit and scope of the conceptual portable nested cook-set. For instance, FIGS. 16 through 19 illustrate a second non-limiting, exemplary embodiment of the conceptual portable nested cook-set, indicated generally by reference numeral 200. Referring to FIG. 16, the present combination cook pot 200 includes a cook pot 202 having substantially the same construction as cook pot 104 described above, with a generally cylindrical body 204 and a tapered, thermally conductive base 206. A foldable handle 208 may be affixed to the side of the body 204 of the cook pot. The cook pot 202 may also be formed with a lip 210 for supporting a vacuum bottle 212. As is described in greater detail below, the vacuum bottle 212 is formed with a utensil clip 214, has a removable bowl 216 attached thereto, and is removably nested within the cook pot 202. A utensil 218 may optionally be retained by the utensil clip 214.

Figure 17:
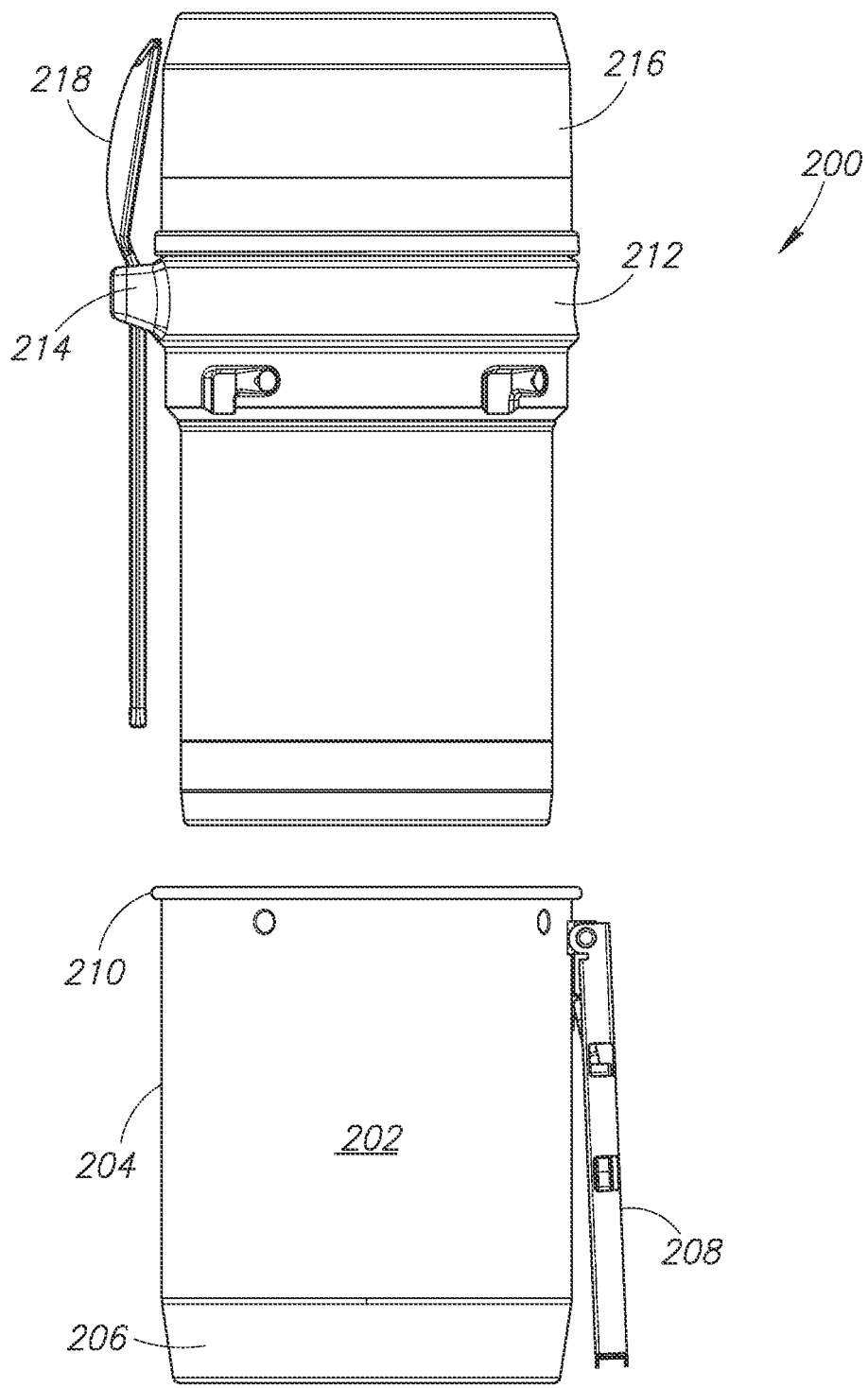
FIG. 17 is a front exploded elevational view of the alternative nested cook-set of FIG. 16, showing the vacuum bottle separated from the cook pot.
Figure 18:
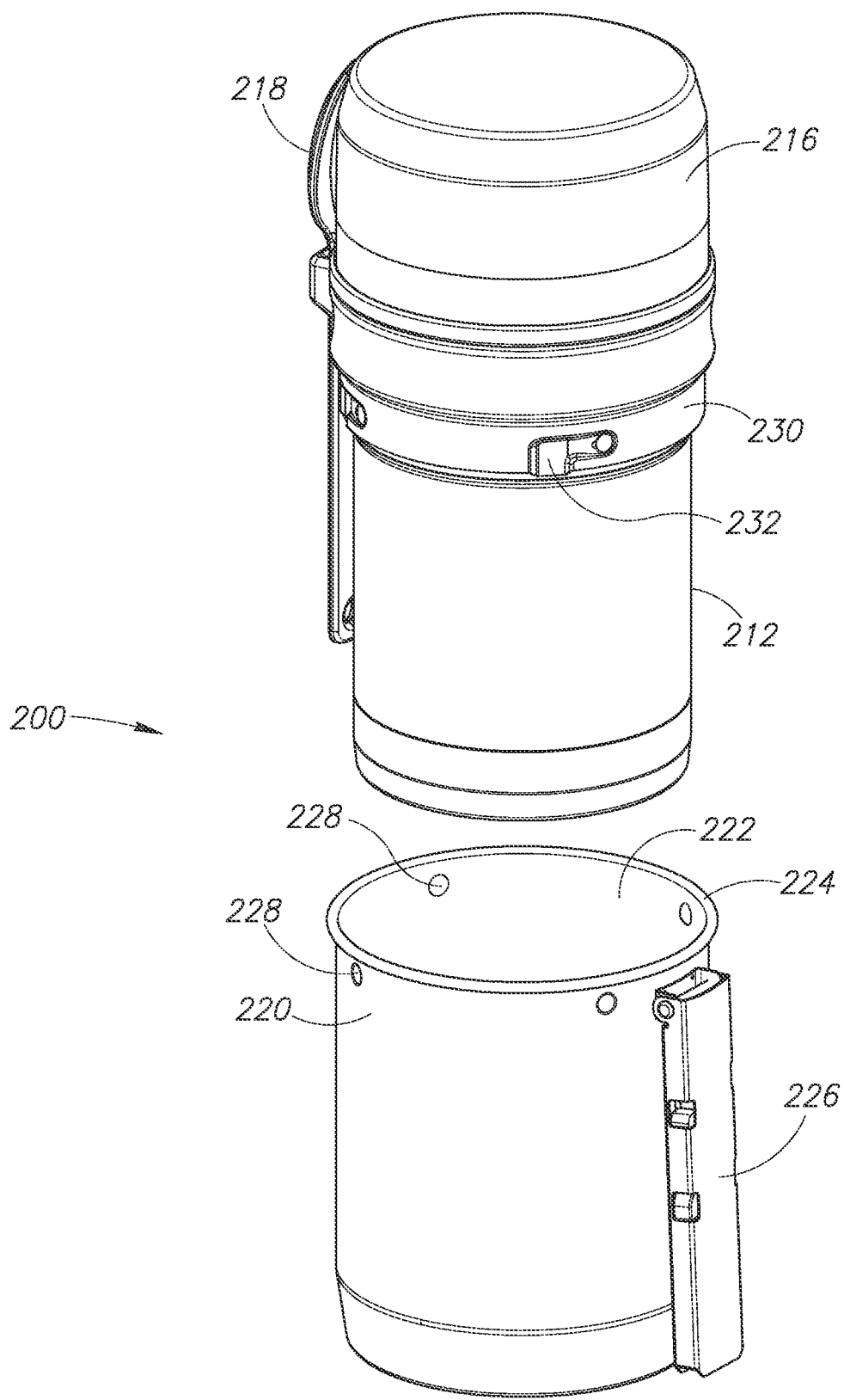
FIG. 18 is a front exploded perspective view of the alternative nested cook-set of FIG. 17.
Figure 19:
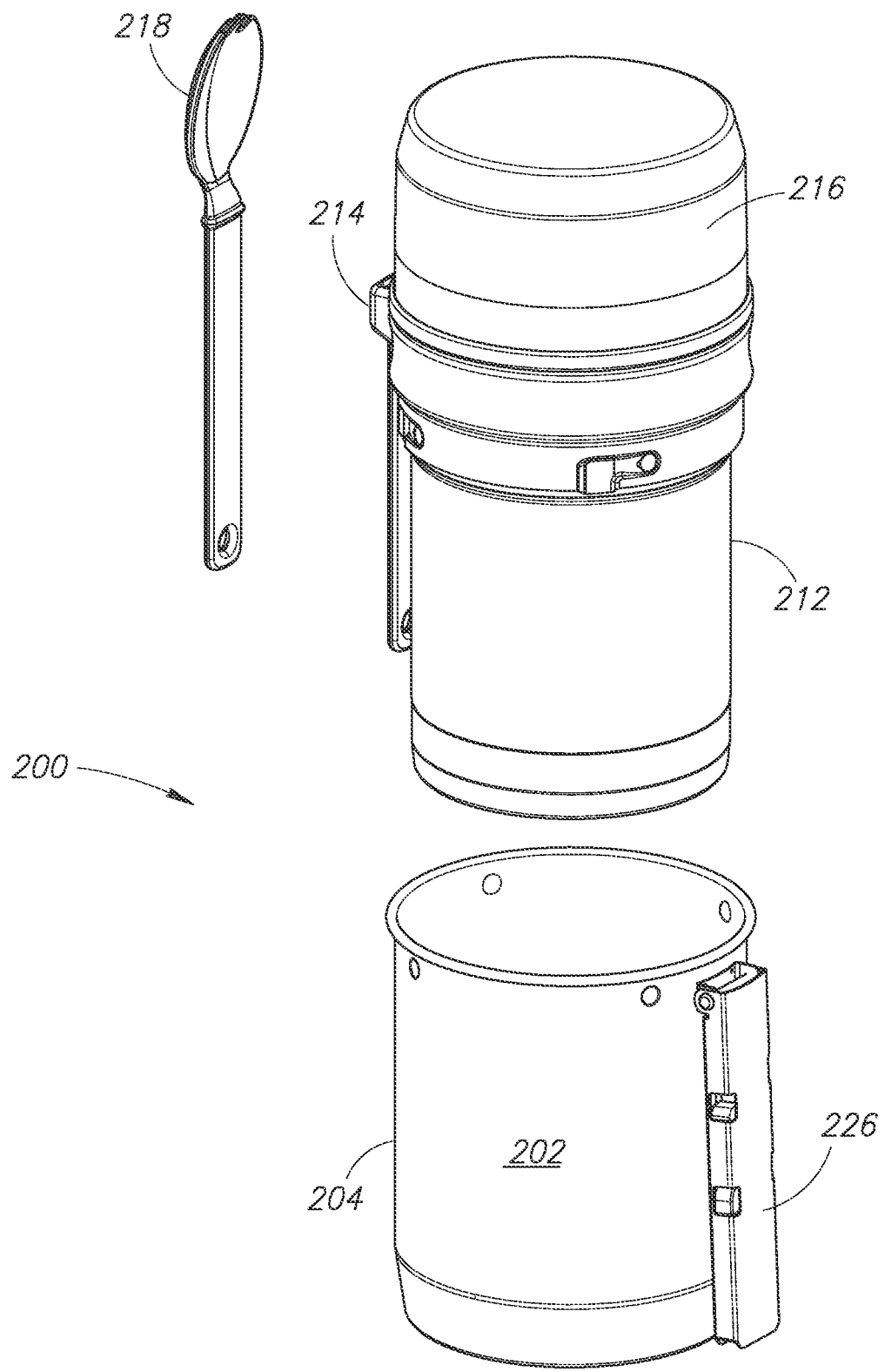
FIG. 19 is a front exploded perspective view of the alternative nested cook-set of FIG. 17, showing the utensil separated from the support clip.

FIGS. 17 and 18 better illustrate the nesting relationship of the cook pot 202 and the vacuum bottle 212. As with the cook pot 104 described above with reference to FIGS. 1-15, the cook pot 202 may be any size and made from any material that is suitable for its intended purpose. The bottom diameter of the tapered base 206 may advantageously be selected to be compatible with one or more commercially available backpacking stoves or other standard heat sources (not shown). The height of the body 204 of the cook pot may then be chosen based on the diameter of the base 206 and the desired interior volume, as well as with consideration to the other components of the combination cook pot, i.e. the vacuum bottle.

Opposite the base 206, the cook pot 202 has an upper portion 220 defining an open top 222 formed with a lip 224 around its circumference. The lip 224 acts to support the vacuum bottle 212. Adjacent to the open top 222, a handle 226 may advantageously be affixed to the body 204. In the same manner as is explained above in reference to FIGS. 2 and 8, the handle 226 may advantageously be movable between, and selectively lockable in a folded position and in an open position. The body 204 is also formed with inwardly projecting retention projections 228. The vacuum bottle 212 may be similar to a conventional vacuum bottle in terms of its interior structure and function while being advantageously dimensioned such that it may nest coaxially within the cook pot 202. Unlike a conventional vacuum bottle, and as is described in more detail above with regard to the embodiment shown in FIGS. 1-15, the vacuum bottle 212 includes a lower neck portion 230 formed with retention notches 232 for cooperating with the complementary retention projections 228 of the body 204 of the cook pot 202. The retention projections 228 cooperate with the retention notches 232 formed in the vacuum bottle 212 to selectively lock the vacuum bottle within the cook pot 202, in the same manner described above.

In use, a user may remove the vacuum bottle 212 from within the cook pot 202. The cook pot 202 may then be used to prepare food in a conventional manner. The unprepared food may be carried in the vacuum bottle 212 and at the time food preparation is to occur, emptied into the cook pot 202. Once the food is prepared in the cook pot 202, the prepared food may then be poured out of the cook pot, for instance, into the vacuum bottle 212, the bowl 216, and/or any other suitable container. The cook-set 200 may then be reassembled for transportation and storage.

As another example, in an alternative, non-illustrated usage of the cook pot 104 of FIGS. 1-15, the combination cook pot 100 may be used as a reverse French-press. To do so, the user would heat fluid in the cook pot 104 in the same manner as described above with reference to FIG. 7. The user would then, prior to adding any food material, insert the press-pot piston 124 into the cook pot 104 in the same manner as described above with reference to FIGS. 10 and 11. The user may then add the food material 208 to the press-pot piston and allow the material to steep in the heated fluid. After an appropriate amount of time, the user may then withdraw the press-pot piston from the cook pot. Steeped, heated liquid will flow through apertures in the screened openings 156 in the lower end portion 148 of the press-pot piston and remain in the cook pot while the food material will be trapped within the press-pot piston and captured at the bottom of the press-pot piston by the screens 158. The user may then pour the contents of the cook pot into a container, such as the vacuum bottle 128, the inner cup 130, the outer cup 132, or any other suitable container.

Accordingly, the conceptual combination cook pot is not limited except as by the appended claims.

The invention claimed is:

1. A nestable cook-set comprising:
a cook pot having a pot sidewall defining an upwardly opening pot interior chamber and having an inwardly projecting retention projection;
a press-pot piston having a piston sidewall and a lower end portion defining an upwardly opening piston interior chamber, the lower end portion having a lower end portion opening, the piston sidewall having a sidewall opening and a retention notch positioned to removably receive the retention projection therein, the piston sidewall having an outer surface dimensioned to be selectively storable at least partially within the pot interior chamber, and the piston sidewall having interior threading;
a screen spanning the lower end portion opening;
a sealing ring extending about the outer surface the piston sidewall between the sidewall opening and the lower end portion opening; and
a storage container having an exterior portion and a selectively sealable interior storage chamber, the exterior portion having a lower portion dimensioned to be selectively storable at least partially within the piston interior chamber, the exterior portion having threading threadably engageable with the interior threading of the piston sidewall.

2. The nestable cook-set of claim 1, wherein the press-pot piston is selectively storable within the cook pot in concentric nested arrangement along a common axis.

3. The nestable cook-set of claim 2, wherein the storage container is selectively storable within the press pot piston in concentric nested arrangement along the common axis.

4. The nestable cook-set of claim 1, wherein the pot sidewall has an upper end portion and the outer surface of the piston sidewall has an upper end portion with a lip portion extending thereabout, the lip portion extending outward sufficiently to engage the upper end portion of the pot sidewall when the press-pot piston is stored within the pot interior chamber.

5. The nestable cook-set of claim 1, wherein the storage container is a vacuum bottle.

6. The nestable cook-set of claim 1, wherein the pot sidewall has an upper end portion and the exterior portion of the storage container has an upper portion dimensioned to be substantially equal to the upper end portion of the pot sidewall.

7. The nestable cook-set of claim 1, wherein the lower end portion of the press-pot piston has an upwardly extending supporting rim for receiving a lower portion of the storage bottle.

* * * * *